United States Patent
Chen et al.

(10) Patent No.: US 10,650,169 B2
(45) Date of Patent: May 12, 2020

(54) SECURE MEMORY SYSTEMS

(71) Applicant: Hewlett Packard Enterprise Development LP, Houston, TX (US)

(72) Inventors: Liqun Chen, Bristol (GB); Chris I. Dalton, Bristol (GB); Fraser Dickin, Bristol (GB); Mark Lillibridge, Mountain View, CA (US); Simon Kai Ying Shiu, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 37 days.

(21) Appl. No.: 15/573,081

(22) PCT Filed: Sep. 14, 2015

(86) PCT No.: PCT/US2015/049936
§ 371 (c)(1),
(2) Date: Nov. 9, 2017

(87) PCT Pub. No.: WO2017/048221
PCT Pub. Date: Mar. 23, 2017

(65) Prior Publication Data
US 2018/0165479 A1    Jun. 14, 2018

(51) Int. Cl.
*G06F 11/30* (2006.01)
*G06F 12/14* (2006.01)
(Continued)

(52) U.S. Cl.
CPC .......... *G06F 21/79* (2013.01); *G06F 12/1408* (2013.01); *G06F 21/602* (2013.01);
(Continued)

(58) Field of Classification Search
CPC combination set(s) only.
See application file for complete search history.

(56) References Cited

U.S. PATENT DOCUMENTS 6,118,874 A    9/2000  Okamoto et al.
7,860,246 B2   12/2010 Cerruti et al.
(Continued)

FOREIGN PATENT DOCUMENTS

| CN | 101536007 A | 9/2009 |
| CN | 102171969 A | 8/2011 |
| WO | WO-2014076176 | 5/2014 |

OTHER PUBLICATIONS

"Meng-Fan Chang, Ching-Hao Chuang, Min-Ping Chen, Lai-Fu Chen, Hiroyuki Yamauchi, Pi-Feng Chiu, Shyh-Shyuan Sheu, Endurance-aware circuit designs of nonvlatile logic and nonvolatile sram using resistive memory (memristor) device, Jan. 30-Feb. 2, 2012, IEEE Xplore, INSPEC#12592052" (Year: 2012).*

(Continued)

*Primary Examiner* — Phy Anh T Vu
(74) *Attorney, Agent, or Firm* — Hewlett Packard Enterprise Patent Department

(57) ABSTRACT

There is provided an example memory system comprising a plurality of memory modules, each memory module comprising a persistent memory to store root key information and encrypted primary data; a volatile memory to store a working key for encrypting data, the encrypted primary data stored in the persistent memory being encrypted using the working key; and a control unit to provide load and store access to the primary data. The memory system further comprises a working key recovery mechanism to retrieve first root key information from a first module and second root key information from a second module; and compute the working key for a given module based on the retrieved first root key information and the retrieved second root key information.

15 Claims, 5 Drawing Sheets

(51) Int. Cl.
*G06F 21/79* (2013.01)
*H04L 9/08* (2006.01)
*G06F 21/60* (2013.01)

(52) U.S. Cl.
CPC .......... *H04L 9/0819* (2013.01); *H04L 9/0836* (2013.01); *H04L 9/0894* (2013.01)

(56) References Cited

U.S. PATENT DOCUMENTS

| | | | |
|---|---|---|---|
| 9,432,342 B1* | 8/2016 | Kothari | ................ H04L 63/061 |
| 2002/0071566 A1 | 6/2002 | Kurn | |
| 2004/0019795 A1* | 1/2004 | Okaue | .................... G06F 21/10 |
| | | | 713/189 |
| 2005/0041803 A1* | 2/2005 | Chateau | .................... G06F 7/58 |
| | | | 380/46 |
| 2005/0177744 A1 | 8/2005 | Herman | |
| 2010/0189262 A1 | 7/2010 | Ducharme et al. | |
| 2010/0299313 A1 | 11/2010 | Orsini et al. | |
| 2011/0199502 A1 | 5/2011 | England et al. | |
| 2012/0201379 A1 | 8/2012 | Fuchs et al. | |
| 2014/0189365 A1 | 7/2014 | Cox et al. | |
| 2014/0317417 A1 | 10/2014 | Ashkenazi | |
| 2014/0331061 A1 | 11/2014 | Wright et al. | |
| 2015/0095600 A1* | 4/2015 | Bahnsen | ................. G06F 9/466 |
| | | | 711/163 |
| 2015/0293857 A1* | 10/2015 | Cope | ....................... G06F 21/79 |
| | | | 713/193 |
| 2017/0250965 A1* | 8/2017 | Resch | ................. G06F 11/0781 |
| 2019/0095630 A1* | 3/2019 | Wang | .................... G06F 21/602 |

OTHER PUBLICATIONS

"Taejin Kim, Sungjin Lee, Jisung Park, Jihong Kim, Efficient lifetime management of SSD-based RAIDs using dedup-assited partial strip writes, Aug. 17-19, 2016, IEEE Xplore, INSPEC#16249006" (Year: 2016).*

Inside Secure, Securing Highly Sensitive Assets with Inside's Safezone Secure Platform, Nov. 28, 2012, 16 pages.

Silva, P., F5 Big-IP Platform Security, Nov. 15, 2011, BigDataExpo. net—From the Blogosphere, 26 pages.

Extended European Search Report, EP Application No. 15904219.1, dated Mar. 29, 2018, pp. 1-7, EPO.

Shamir, Programming Techniques, How to Share a Secret, Nov. 1979, pp. 612-613.

* cited by examiner

SECURE MEMORY SYSTEMS

BACKGROUND

The contents of a computer memory can be protected using a key-based encryption system.

BRIEF DESCRIPTION OF THE DRAWINGS

The following detailed description references the drawings, wherein.

DETAILED DESCRIPTION

Figure 1:
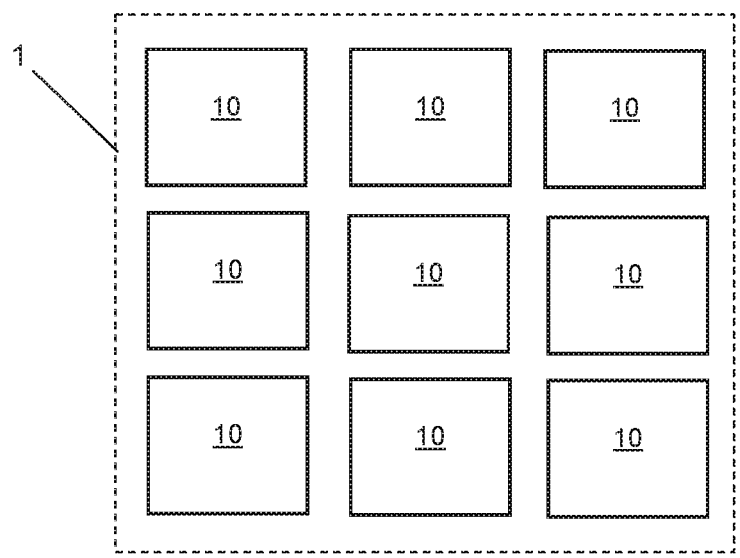
FIG. 1 is a block diagram of an example memory system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Recent advances in photonics have enabled optical connections to external memory resources. Such optical interconnects provide reduced latencies and potentially higher bandwidths, making accesses to remote memory resources nearly as fast as local accesses. Thus, the possibility of a "memory fabric" that integrates multiple different memory resources across several racks of a data centre (or even across several data centres) is created. Such a memory fabric may appear to a processor accessing data stored in the memory fabric as a single memory space.

A technical challenge may exist with a memory system that comprises multiple different memory resources as it may be possible for a malicious agent to attack (e.g., by physically removing) one or several of the individual memory resources comprised in the memory system. It may be possible for a malicious agent to recognize a memory resource of the memory system that has special features (e.g., by detecting that this resource has relatively heavier communications activity than the other resources in the memory system) and to selectively target such a memory resource. A malicious agent that has successfully attacked one or several memory resources from a memory system may further attempt to read data from the attacked memory resource(s).

Examples disclosed herein provide technical solutions to these technical challenges. An example memory system comprising a plurality of memory modules is able to continue functioning in a secure manner if one or several modules are attacked. Furthermore, provided that the number of modules attacked is small, compared to the total number of modules in the system, it can be impossible to decrypt data stored by modules which have been successfully attacked. Thus, a memory fabric can be made secure against an attack from a malicious agent targeting one or several components of the memory fabric, including an attack in which one component or several components of the memory fabric are physically removed.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or several of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is an example memory system 1. The memory system 1 comprises a plurality of memory modules 10. Each memory module 10 comprises a persistent memory to store root key information and encrypted primary data, a volatile memory to store a working key for encrypting data, and a control unit to provide load and store access to the primary data. The primary data stored in the persistent memory is encrypted using the working key. The control unit may provide load and store access to the primary data by using the working key to encrypt the primary data before it is stored in the persistent memory and to decrypt the primary data after it is loaded from the persistent memory.

For the purposes of this specification, the phrase "providing load and store access" is used to mean providing access to data via load and store instructions targeting a memory address space. Thus, a processor may be able to retrieve a first word of the primary data by issuing a load instruction targeting a first memory address associated with the first word of primary data. It likewise may be able to replace the first word of the primary data by issuing a store instruction targeting the first memory address associated with the first word of the primary data. Similarly, it may be able to retrieve a second word of the primary data by issuing a load instruction targeting a second memory address associated with the second word of the primary data. Thus, the processor "sees" unencrypted data, in spite of the fact that the primary data is stored encrypted in the persistent memory.

The memory system 1 further comprises a working key recovery mechanism (not illustrated) to retrieve first root key information from a first memory module 10 and second root key information from a second memory module 10; and to compute the working key for a given memory module 10 of the plurality of memory modules based on the retrieved first root key information and the retrieved second root key information.

In some examples at least some of the memory modules are connected, e.g., by communications links, so as to form a network of modules. This may allow the control units of the connected modules to communicate with each other. It may allow a processor connected to this network to access the primary data of any memory module in the network. At least some of the memory modules 10 may (but need not) be located remotely from each other. In some examples at least some of the memory modules 10 are connected so as to form a peer-to-peer network. In some examples (such as the example of FIG. 1) the memory modules 10 are not connected to each other. Many network topologies are possible; for example, each memory module may be directly attached to just its neighbours, but may be to route communications for other memory modules (i.e. memory modules to which it is not directly connected) in an appropriate direction so that each memory module can communicate with each other memory module.

In some examples each memory module 10 is connected to a memory bus, by means of which it can receive load and store requests (e.g., from a processor of a computing device wishing to access data stored by the memory system 1). In such examples the control unit 23 of each memory module may be to provide load and store access via a memory bus to at least one processor. A memory bus may be a bus that connects one or several memories to one or several processors, allowing load and store access to the memories by the processors. An example of a typical memory bus protocol is DDR4.

In examples in which at least some of the memory modules 10 are connected by communications links, the communications links between connected memory modules 10 may be secure or capable of hosting secure channels. In some examples the communications links or particular channels running over them between connected memory modules are protected by security and authentication protocols. This can ensure that signals sent between the memory modules 10 cannot be eavesdropped on. Any suitable cryptographic techniques can be used for securing communications links between the memory modules 10, including entity authentication, data confidentiality, data integrity, key establishment, etc. The communications links may be wired or wireless. The communications links may be high-speed communications links. The communications links may be optical communications links.

Figure 2:
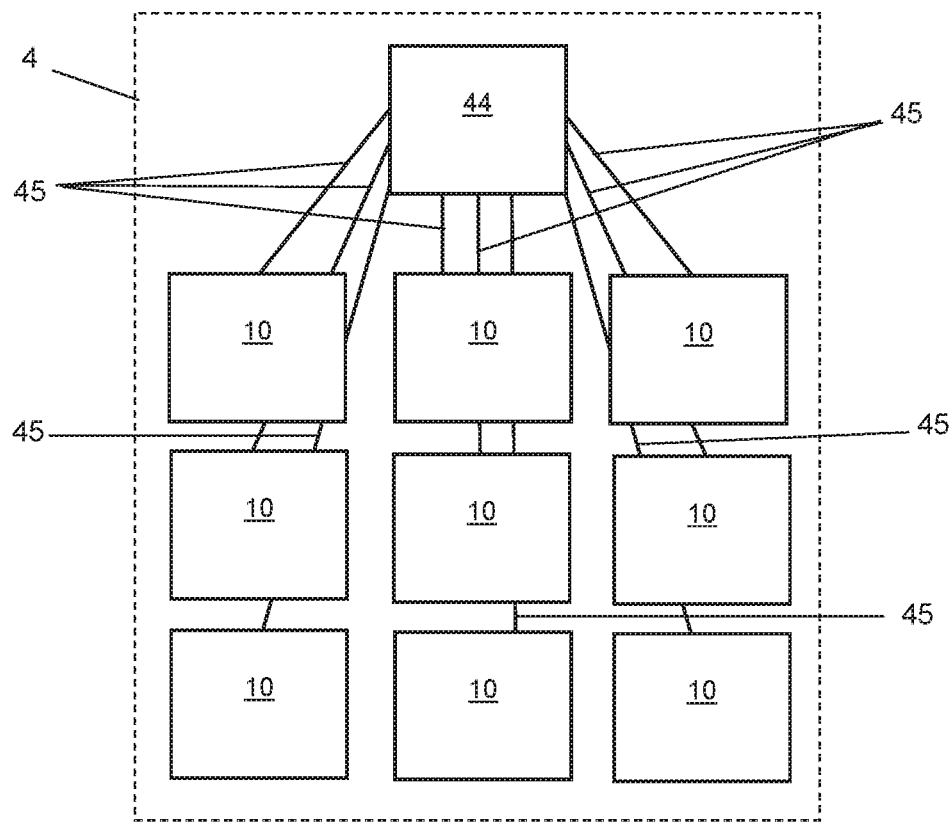
FIG. 2 is a block diagram of an example memory system.

In some examples, the memory system comprises a module manager, which is connected to at least one of the memory modules of the memory system. FIG. 2 illustrates one such example. In the memory system 4 of FIG. 2, each memory module 10 is connected to a module manager 44 by a communications link 45. In other examples, not all of the memory modules 10 are connected to the module manager 44. In other examples, the module manager is coupled to each of the memory modules 10, but is not connected directly to every memory module 10. The communications links 45 may have any of the features described above in relation to the memory system 1. The module manager 44 may be remote from the modules 10. The module manager 44 may comprise any type of computational device, including, e.g., a server, a general purpose computer, etc. The module manager may be provided in the form of functionality to run on a processor that is to access primary data stored by the memory system via load and store instructions.

In FIGS. 1 and 2 and other Figures described herein, different numbers of components, engines, or entities than depicted may be used. For example, the number of memory modules comprised in the memory system and/or the number of connections between them may be more or fewer than shown in FIGS. 1 and/or 2.

Figure 3:
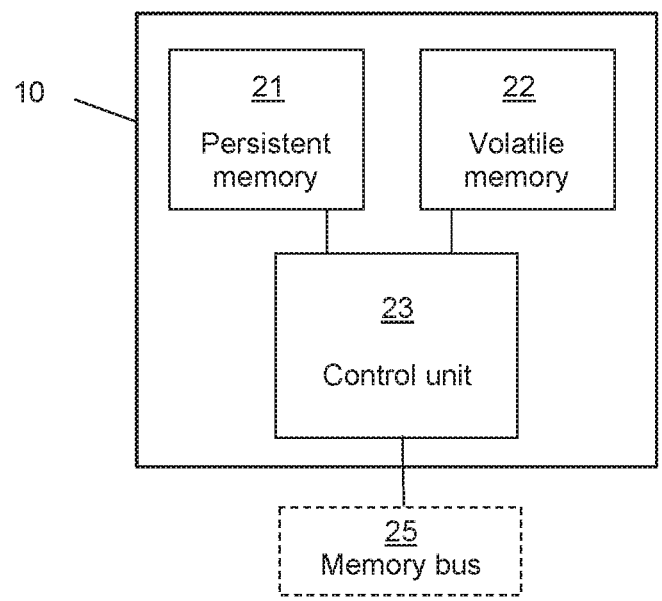
FIG. 3 is a block diagram of an example module of an example memory system.

FIG. 3 is an example memory module 10, e.g., of the example memory system 1. The module 10 comprises a volatile memory 22. The volatile memory 22 stores data when the memory system is operational (e.g., powered up) and does not store data when the memory system is non-operational (e.g., powered down). In some examples the volatile memory 22 stores data for as long as power is supplied to the volatile memory 22. In such examples data stored in the volatile memory 22 is lost when power ceases to be supplied to the volatile memory 22. The volatile memory 22 is to store a working key for encrypting data. In some examples the volatile memory is comprised in a trusted location of the memory module (such as a TrustZone or an FPGA with access control). Storing a working key in a volatile memory of a memory module means that the working key will be lost if that module loses power, e.g., as a result of being maliciously attacked and/or removed from the memory system 1.

The module 10 further comprises a persistent memory 21, which may be a non-volatile memory (NVM). In some examples the persistent memory 21 comprises solid-state NVM. In some examples the persistent memory 21 comprises byte-addressable solid-state NVM. The persistent memory 21 may be a fast access memory. The persistent memory 21 may be associated with a range of memory addresses. In some examples the persistent memory 21 of the memory module 10 is associated with a unique range of memory addresses, such that no other memory module 10 in the memory system 1 comprises a persistent memory that is associated with the same range of memory addresses as the persistent memory of the module 10.

The persistent memory 21 is to store encrypted primary data that is encrypted using a working key stored in the volatile memory 22. The persistent memory 21 may contain encrypted primary data that is encrypted using a working key stored in the volatile memory 22.

The encrypted primary data may comprise any or all of the data contained in the persistent memory 21 at a given time. The primary data may comprise any type of data. The persistent memory 21 may contain other data in addition to the encrypted primary data, which may or may not be encrypted. The persistent memory 21 may contain encrypted secondary data in addition to encrypted primary data. Such secondary data may be the same type as the primary data, or may be a different type to the primary data. In some examples the secondary data may be encrypted using a different key from the key used to encrypt the primary data. In some examples the primary data is encrypted using a working key stored in the volatile memory of a first memory module (e.g., the memory module in which the persistent memory storing the encrypted primary data is comprised) and the secondary data is encrypted using a working key stored in the volatile memory of a second, different, memory module.

The persistent memory 21 is also to store root key information. In some examples the root key information stored by each memory module comprises a masked root key. The masked root key stored by a given memory module may be derived, e.g., from a root key associated with the given memory module 10 and a mask value associated with the given memory module 10. A mask value associated with a given memory module may comprise, e.g., a random number having the same entropy as the root key associated with that memory module 10. In some examples a masked root key stored by a given memory module 10 comprises a combination of the root key associated with the given memory module 10 and the mask value associated with the given memory module. A combining operation used to create a masked root key may comprise, e.g., XOR, addition or multiplication, a cryptographic encryption or hashing process, etc. For example, a masked root key stored by a given memory module 10 may be computed by XORing the root key associated with the given memory module 10 with the mask value associated with the given memory module 10.

In some examples the persistent memory 21 of the memory module 10 may be to store a first masked root key derived from a first root key associated with that memory module 10 and a first mask value associated with that memory module 10. In some examples the persistent memory 21 of the memory module 10 may be to store first encrypted primary data that has been encrypted using a working key stored in the volatile memory 22 of that memory module 10 and second encrypted primary data that has been encrypted using a working key stored in the volatile memory 22 of another memory module of the memory system 10.

For example, a first memory module 10 of the plurality of memory modules may be associated with a first root key and a second memory module 10 of the plurality of memory modules may be associated with a second, different, root key, and the persistent memory 21 of the first memory module may be to store a first masked root key derived from the first root key and the persistent memory of the second memory module may be to store a second masked root key derived from the second root key. In some examples at least one of the first and the second memory modules 10 may be to store a first masked root key derived from the first root key and a second masked root key derived from the second root key. In some examples at least one of the first and the second memory modules may be to store first primary encrypted data encrypted using a working key stored in the volatile memory 22 of the first memory module 10; and second primary encrypted data encrypted using a working key stored in the volatile memory 22 of the second memory module 10. Such examples enable the recovery of data stored by a module that fails or that has been maliciously removed from the memory system.

In some examples a root key associated with a given memory module 10 may be part of an encryption key hierarchy, in which case the persistent memory 21 of the given memory module 10 may be to store at least one encrypted lower-level key of the encryption key hierarchy and the volatile memory 22 of the given memory module 10 may be to store at least one decrypted lower-level key of the encryption key hierarchy. In an encryption key hierarchy a root (or master, or top-level) key is used to encrypt other, lower-level, keys that are in turn used to encrypt the actual data that is to be protected. A key hierarchy may be represented by a tree, which starts from the root key. The total number of levels in a key hierarchy can vary. The number of branches in a key hierarchy can vary. For example, a simple multi-level key hierarchy comprises a top-level key (i.e., the root key) and a bottom-level key. However, some key hierarchies comprise one or several intermediate-level keys. In such examples, except for the bottom-level (or leaf) key of each branch, every key in the hierarchy is used to encrypt/decrypt the key(s) of the next level down. In other words, each intermediate key is to access a lower-level key. The bottom-level keys are used to encrypt/decrypt the stored data protected by the key hierarchy. When a key of a key hierarchy is used, it may be (temporarily) stored in the volatile memory 22 of the memory module 10 that is using the key.

A root key associated with a given memory module 10 may also be associated with at least one other memory module 10 in the memory system. In some examples a single root key is associated with all of the memory modules 10 in the memory system 1. In some examples each memory module 10 in the memory system 1 is associated with a different root key. Similarly, a mask value associated with a given memory module 10 may also be associated with at least one other memory module 10 in the memory system. A single mask value may be associated with all of the memory modules 10 in the memory system 1. Each memory module 10 may be associated with a different mask value.

In some examples the root key information comprises a share of a mask value associated with a memory module of the plurality of memory modules. In some examples the root key information comprises a share of a mask value associated with the memory module that stores the root key information. The memory module with which the mask value is associated may be the memory module that stores the share, or it may be a memory module other than the memory module that stores the share. In some examples a mask value is split (divided) into shares using a secret sharing scheme, e.g., a threshold-based secret sharing scheme.

A threshold-based secret sharing scheme protects a secret (which in some of the examples is a mask value) by means of a dealer node splitting the secret into shares and distributing these shares among a set of nodes (the shareholder nodes). The secret can then be reconstructed using a specified minimum number of shares (equal to the threshold). The threshold t may be less than the total number n of shareholders, such that the secret may still be reconstructed by the remaining shareholder nodes if up to (n–t) shareholder nodes fail. The secret may not be reconstructable using fewer than the threshold number of shares.

In some examples the shares of a given mask value used by the memory system 1 are arranged such that it is possible to recover the given mask value using the shares stored by any group of memory modules 10 comprised in the subset storing shares of the given mask value that has a group size greater than or equal to a threshold t, and such that it is not possible to recover the given mask value using the shares stored by a group of memory modules 10 having a group size less than t. The value of t may be selected such that the probability of t or more memory modules 10 being attacked is very low.

In some examples the persistent memory 21 of a memory module 10 is to store a share of a mask value associated with that memory module 10. The memory module 10 may be a member of a subset of memory modules 10 associated with that memory module 10. In some examples the persistent memory 21 of a first memory module 10 is to store a share of a mask value associated with a second, different, memory module 10. The first memory module 10 may be a member of a subset of memory modules 10 associated with the second memory module 10. A subset of memory modules 10 associated with a given memory module 10 may comprise any number of memory modules between one and the total number of memory modules in the memory system 1. The first memory module 10 may be a member of multiple subsets of memory modules, each of the multiple subsets being associated with a different memory module of the plurality of the memory modules 10. A memory module 10 may not be a member of any subsets. A memory module 10 may not store any shares of mask values. The subset membership status and/or the number and identity of the shares stored by the memory module may change overtime, e.g., responsive to changes in the modules comprised in the memory system 1. In some examples the persistent memory 21 of a given memory module 10 is to store a maximum of one share of any given mask value. In some examples the persistent memory 21 of a given memory module 10 is to store a plurality of shares. In some examples each of a plurality of shares stored by the persistent memory 21 is a share of a different mask value. In some examples two or more of a plurality of shares stored by the persistent memory 21 are shares of the same mask value.

The memory module 10 further comprises a control unit 23. The control unit 23 may comprise a processor. The control unit 23 may comprise a multi-core system-on-a-chip (SoC). The control unit 23 is to provide load and store access to the primary data (i.e., the primary data stored encrypted in the persistent memory 21). The control unit 23 may provide store access to the primary data by using the working key to encrypt the primary data before it is stored in the persistent memory and to decrypt the primary data after it is loaded from the persistent memory. In some examples the control unit 23 is to provide load and store access to the primary data via a memory bus 25 to at least one processor (e.g., a processor of a computing device wishing to access data stored by the memory system 1). In some examples the control unit 23 is to communicate with control units 23 of other memory modules 10 in the memory system 1. In some examples the control unit 23 is in communication with a memory bus 25 of the memory system 1. In some examples the control unit 23 is to receive load and/or store commands via the memory bus 25.

Figure 4:
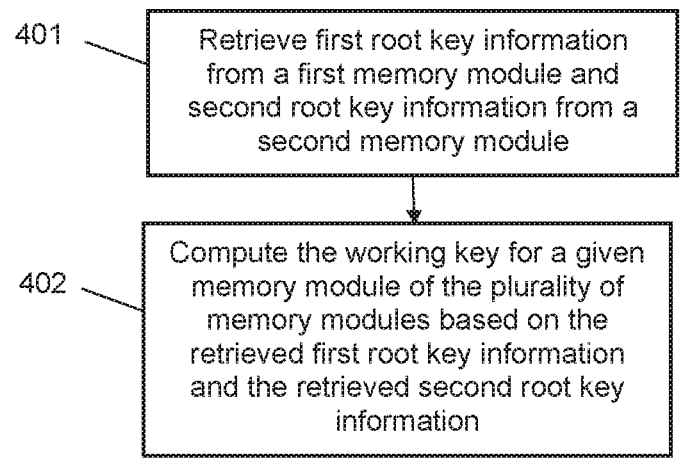
FIG. 4 is a flowchart illustrating an example working key recovery mechanism of an example module of an example memory system.

FIG. 4 illustrates a working key recovery mechanism, e.g., of the memory system 1. The working key recovery mechanism may be implemented by one of the plurality of memory modules 10. The working key recovery mechanism may be implemented in a distributed manner, e.g., by two or more of the plurality of memory modules. In some examples in which the memory system comprises a module manager in communication with each of the plurality of memory modules 10 (e.g., the example of FIG. 2), the working key recovery mechanism may be implemented at least partly by the module manager. The working key recovery mechanism may comprise instructions that, when executed by a processor of the memory system, cause the memory system (or a component or components thereof) to perform certain operations specified by the instructions. In some examples the working key recovery mechanism comprises a set of instructions for execution by a processor of a module manager (e.g., the module manager 44 of the memory system 4).

The working key recovery mechanism is to retrieve first root key information from a first memory module and second root key information from a second memory module (block 401). The working key recovery mechanism is also to compute the working key for a given memory module of the plurality of memory modules based on the retrieved first root key information and the retrieved second root key information (block 402). In some examples the working key recovery mechanism is to retrieve root key information from a plurality of memory modules 10. In some examples the working key recovery mechanism is to retrieve root key information from a predetermined number of memory modules 10. The working key recovery mechanism may request root key information from more memory modules 10 than it needs root key information from. This may be because some memory modules 10 are nonresponsive or slow to reply. In examples in which the working key recovery mechanism is implemented (wholly or partly) by one or several of the memory modules 10, the working key recovery mechanism may be implemented by the first memory module, the second memory module, or neither the first nor second memory module. In some examples the working key recovery mechanism is to retrieve root key information from a subset of memory modules associated with the given memory module 10.

Figure 5:
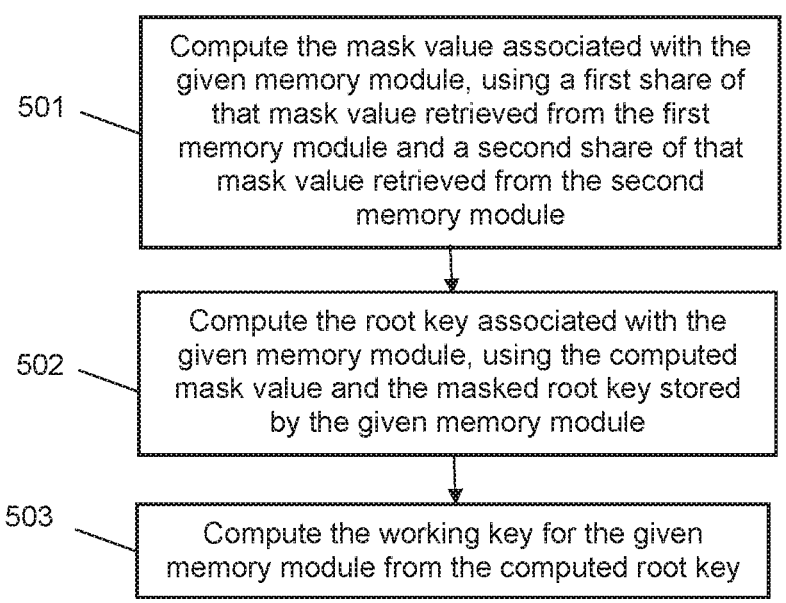
FIG. 5 is a flowchart illustrating an example working key recovery mechanism of an example module of an example memory system.

FIG. 5 illustrates an example working key recovery mechanism of an example memory system in which the root key information stored by each memory module comprises a masked root key derived from a root key associated with that memory module and a mask value associated with that memory module, and a share of the mask value. The masked root key, the root key, and the mask value may have any of the features described above in relation to the operation of the memory system 1 and/or the memory module 10. The example working key recovery mechanism of FIG. 5 is to compute the mask value associated with the given memory module using a first share of that mask value retrieved from the first memory module and a second share of that mask value retrieved from the second memory module (Block 501). The first share and the second share may have any of the features described above in relation to the operation of the memory system 1 and/or the memory module 10. In some examples, the working key recovery mechanism may compute the mask value using more than two shares. Each such share may be retrieved from a different memory module 10. The working key recovery mechanism may compute the mask value using a secret sharing scheme. The secret sharing scheme may have been used to divide the mask value into shares such that any subset of shares of greater than a predetermined size can be used to reconstruct the mask value.

The example working key recovery mechanism of FIG. 5 is also to compute the root key associated with the given memory module using the computed mask value and the masked root key stored by the given memory module (block 502); and to compute the working key for the given memory module from the computed root key (block 503). Computing the root key may be done by undoing the combination of the root key with the mask value. For example, in examples in which the masked root key was derived by adding the mask value to the root key, the root key may be computed by subtracting the mask value from the masked root key. In some examples, the working key is the same as the root key. In such examples computing the working key is a no-op.

In a particular example, one or several of the memory modules 10 in the memory system 1 comprise a local key manager (LKM). The LKM of a given memory module 10 may own the root key (or key hierarchy) associated with that given memory module 10. The LKM may be associated with a subset of other LKMs in the memory system 1 (i.e., LKMs comprised in other memory modules 10 of the memory system 1). The LKMs in the subset may each store a share of the mask value used to derive the masked root key owned by the LKM with which the subset is associated (i.e., the LKM comprised in the given memory module).

In some examples the LKM may comprise instructions that, when executed by a processor of the memory module 10 comprising the LKM, cause that processor to perform certain operations specified by the instructions. In other examples the LKM may be implemented as hardwired logic circuits. In an example, the LKM is to request a mask value associated with the given memory module 10. The mask value may be requested from a function comprised in the memory module 10 comprising that LKM, or from another entity comprised in the memory system 1 (e.g., another memory module, or a module manager). The mask value may be requested from an entity comprising a master key manager (MKM). Requesting the mask value may comprise the LKM sending a request message to another entity comprised in the memory system.

The LKM may be to, responsive to receiving a requested mask value, determine a root key associated with the given memory module 10 based on the received mask value associated with the given memory module 10. Determining a root key associated with the given memory module 10 may also be based on a masked root key associated with the given memory module 10. The requested mask value may be received from a MKM of the memory system. The requested mask value may be received in a message from another entity comprised in the memory system. The requested mask value may be received from a function of the given memory module 10. Determining the root key may comprise performing a reverse version of a combination operation used to create the masked root key associated with the given memory module 10.

The LKM may be to determine a working key based on the determined root key. The working key may be determined to be the same as the determined root key in some examples.

The LKM may be to load encrypted data stored in the persistent memory 21 of a memory module 10, e.g., responsive to receiving a load request in respect of particular data (e.g., a word of the primary data). Loading the encrypted data stored in the persistent memory 21 may comprise, for example, using the working key to decrypt the encrypted data (e.g., the encrypted primary data). Loading the encrypted data may comprise retrieving an encrypted second working key (e.g., from the persistent memory of the memory module 10 or from another entity comprised in the memory system 1), using the working key to decrypt the encrypted second working key, and using the second working key to decrypt the encrypted data (e.g., encrypted secondary data, which has been encrypted using the second working key).

The LKM may be to store encrypted data in the persistent memory 21 of a memory module 10, e.g., responsive to receiving a store request in respect of particular data (e.g., a word of the primary data). Storing the encrypted data stored in the persistent memory 21 may comprise, for example, using the working key to encrypt data comprised in the store request (e.g., the word of new primary data). Storing the encrypted data may comprise retrieving an encrypted second working key (e.g., from the persistent memory of the memory module 10 or from another entity comprised in the memory system 1), using the working key to decrypt the encrypted second working key, and using the second working key to encrypt the data comprised in the store request (e.g., to create a word of encrypted secondary data, which has been encrypted using the second working key).

In some examples each memory module 10 of the memory system 1 comprises a LKM and therefore has all or some of the functionality described above.

In some examples, the memory system comprises a master key manager (MKM). The MKM may be comprised in one of the memory modules 10, or in a module manager 44. In some examples the MKM is comprised in an exalted node of the memory system 1. An exalted node may be physically different from the other nodes of the memory system, e.g., it may comprise a different device, or may be located in a special location.

The MKM may store a record of which memory module 10 stores (i.e., in its persistent memory 21) which share of each mask value currently in use by the memory system 1. In some examples the MKM is to maintain the record of which memory module 10 stores which share of each mask value, e.g., by updating the record when changes occur to the mask values and/or storage locations. The MKM may therefore comprise or be in communication with a persistent memory that contains a record of storage locations of shares of mask values. The identity of a memory module 10 that stores a given share may be considered to be a storage location of that share. The record of storage locations of shares of mask values may comprise a look-up table. In some examples, the MKM may not store any records of which memory module 10 stores which shares. Instead, the MKM may simply send a request for the required shares to all of the memory modules 10 in the memory system 1 when the MKM needs the shares. The shares may be labelled with a share number, a mask value ID, and/or other information to enable the MKM to locate and assemble correctly needed shares. The MKM may request shares of only a particular mask value.

In some examples the MKM is to divide mask values into shares, and to distribute these shares. Thus, the MKM may play the role of a dealer node in a secret sharing scheme. The MKM may be to perform initial share splitting and distribution operations, e.g., during initialisation of the memory system 1. The initial share splitting and distribution operations may be performed in accordance with a threshold-based secret sharing scheme. The initial share splitting and distribution operations may be performed such that the resulting shares have the features described above in relation to the operation of the module 10.

The initial share splitting and distribution operations performed by the MKM may comprise the MKM receiving at least one mask value from, e.g., a function of the MKM, a LKM, or another entity in the memory system. In some examples (i.e., examples in which mask values are generated by at least one of the memory modules 10), receiving the at least one mask value comprises receiving a mask value from one memory module or from several of the memory modules 10 in the memory system 1. In some examples receiving the at least one mask value comprises receiving a mask value from each memory module 10 of the memory system 1.

MKM authentication may be used for this communication. MKM authentication can be achieved using a standard cryptographic entity authentication mechanism, such as one of the mechanisms specified in ISO/IEC 9798 Information technology—Security techniques—Entity authentication. The memory modules 10 may communicate mask values or shares only to authenticated MKMs or LKMs. They may do so in a manner that prevents other parties from eavesdropping successfully (e.g., from determining the shares).

Upon receiving a mask value, the MKM may randomly choose a subset of n share holder memory modules from the complete set of memory modules 10 comprised in the memory system 1. In some examples the subset of share holder memory modules may comprise all of the memory modules 10 in the memory system 1. The MKM may then compute a set of n shares using a secret sharing scheme. An example of a secret sharing scheme that could be used to compute the shares is described in A. Shamir, "How to share a secret," *Communications. ACM*, vol. 22, no. 11, pp. 612-613, 1979. The MKM may then distribute the computed shares to memory modules in the subset. In some examples the MKM distributes one computed share to each module in the subset. This distribution may be done over secure channels so eavesdroppers cannot learn the shares.

The MKM performs these share splitting and distribution operations in respect of each received mask value. In some examples a single mask value is used by the memory system 1, in which case the MKM performs the share splitting and distribution operations in respect of the single mask value. In some examples a different mask value is used for each memory module 10 of the memory system 1, in which the number of received mask values is equal to the number of modules 10 in the memory system. In some examples the number of mask values used by the memory system 1 is greater than one and less than the total number of memory modules 10 comprised in the memory system 1. The MKM may create and/or populate a record (e.g., in the form of a lookup table) that indicates which mask values are associated with which memory modules, and/or which memory modules store shares of which mask values. The MKM may then send a copy of the populated record to one (or several) other entities of the memory system 1, such that a back-up of the record is created.

In some examples the MKM may comprise instructions that, when executed by a processor of the memory system 1 (e.g., a processor of a memory module 10, or a processor of a module manager 44), cause the memory system 1 to perform certain operations specified by the instructions. In other examples the MKM may be implemented as hardwired logic circuitry. In an example, the MKM is to cause the memory system 1 to determine which memory modules 10 store shares of a given mask value. The determination may be performed responsive to the MKM receiving a request for the given mask value from a memory module 10, e.g., in the form of a request message. The determination may be performed based on the record of storage locations. The determining may comprise accessing a look-up table stored in a persistent memory comprised in the MKM, or with which the MKM is in communication. The determining may comprise requesting shares from each memory module 10 in the memory system 1 without knowing in advance which memory module 10 stores which share.

The MKM (or, in some examples, the LKM) may be to cause the memory system 1 to request shares of the given mask value from the memory module(s) 10 storing those shares (e.g., memory module(s) 10 that have been determined to be storing the shares, or all of the memory modules 10 in the memory system 1). Requesting the shares of the requested mask value may comprise sending a request message to each of the memory modules 10 determined to be storing the shares. If the MKM/LKM is comprised in a particular memory module 10, the share of that memory module 10 may be directly retrieved rather than a message being sent.

The MKM (or, in some examples, the LKM) may be to cause the memory system 1 to determine the given mask value based on the received requested shares. The determining of the given mask value may be performed responsive to receiving the requested shares, e.g., from the memory modules storing those shares. The determining of the given mask value may be performed responsive to all of the requested shares having been received. The determining of the given mask value may be performed responsive to a predefined minimum number of the requested shares have been received. The predefined minimum number may comprise a threshold value of a secret sharing scheme used in the splitting of the mask value into shares.

The MKM (or, in some examples, the LKM) may be to cause the memory system 1 to send the given mask value to the memory module 10 from which the request for the given mask value was received. The given mask value may be sent, for example, in a message to the memory module 10 from which the request for the given mask value was received.

An MKM instruction set or logic (i.e., an instruction set or logic that, when executed, causes the memory system 1 to perform the operations described above in relation to the MKM) may be comprised in one or several entities (e.g., memory modules or a module manager) of the memory system 1 that do not normally operate as an MKM. In such entities, the MKM instruction set or logic circuitry may not be executed/exercised (e.g., it may be dormant) during normal operation of the entity. In such examples the MKM functionality may be activated by a specific event, e.g., a control signal from a memory module 10 or a module manager 44, an input from an operator, or a detection by the entity that the entity in which the MKM is comprised has been attacked, has failed, and/or has been removed from the memory system 1. In such examples another entity of the memory system (i.e., other than the entity comprising the MKM) may therefore be able to take over the function of MKM in the event that the entity comprising the MKM is attacked, fails, and/or is removed from the memory system 1.

In some examples, an entity of the memory system comprises an idle master key manager (iMKM), e.g., in one of the memory modules 10 or in a module manager 44. The entity of the memory system comprising the iMKM may comprises or be in communication with a persistent memory that contains a copy of the record of which mask value is associated with which memory module and/or which memory module stores which share of each mask value (i.e., a copy of the record stored by the MKM). The iMKM may thus store a copy of the share location record maintained by the MKM.

In the event that the entity comprising the MKM is attacked, fails, and/or is removed, in some examples the entity comprising the iMKM can take the place of the entity comprising the MKM, and take on the function of MKM. In some such examples the entity comprising the iMKM comprises an MKM instruction set or logic circuitry. The MKM instruction set of the entity comprising the iMKM may be dormant until activated, e.g., by a control signal from another entity, an input from an operator, or a detection by the entity comprising the iMKM that the entity comprising the MKM has failed, been attacked, and/or been removed from the memory system 1. In some examples, the entity comprising the iMKM comprises security features to prevent malicious activation of the MKM functionality. For example, such security features may comprise an entity authentication mechanism, such that an authorized entity can serve as the new MKM and be accepted by memory modules 10 of the memory system 1 and an unauthorised entity cannot.

In some examples, in the event that the entity comprising the MKM is attacked, fails, and/or is removed, the entity comprising the iMKM is to provide the copy of the share storage location record to another entity in the memory system 1 (e.g., one of the modules 10, a module manager 44, or a newly added module). The entity to which the copy share storage location record is provided may then take on the function of MKM. In some examples, e.g., examples in which the entity comprising the MKM was an exalted node, this node is physically replaced by another exalted node. The new exalted node can then take on the MKM function. In such examples the entity comprising the iMKM may provide the copy share storage location record to the new exalted node.

In some examples the memory system 1 comprises a single entity that comprises an iMKM. In some examples the memory system 1 comprises multiple entities that comprise iMKMs. In some examples each memory module 10 in the memory system may comprise an iMKM. The number and nature of the entities that comprise an iMKM can depend on the particular application of the memory system 1.

Example memory systems continue to function and to maintain the security of stored data even if one or several memory modules are attacked. In examples that use a secret sharing scheme having a threshold t to split each mask value, up to t−1 memory modules may be removed from the memory system before it is possible to access any data stored by any of the removed memory modules, under the condition that the data encryption keys of the removed modules can be retrieved from the t removed modules. This is the case even if one of the removed modules has a special function, e.g., it comprises an MKM. As such, some example memory systems are to perform certain operations responsive to the attack, failure, or removal of an entity from the memory system.

In one such example the memory system 1 comprises a mask value reset mechanism, for generating a new mask value associated with a given memory module 10. The mask value reset mechanism may be implemented by one of the plurality of memory modules 10. The mask value reset mechanism may be implemented in a distributed manner, e.g., by two or more of the plurality of memory modules. In some examples in which the memory system comprises a module manager in communication with each of the plurality of memory modules 10 (e.g., the example of FIG. 2), the mask value reset mechanism may be implemented at least partly by the module manager. The mask value reset mechanism may comprise instructions that, when executed by a processor of the memory system, cause the memory system (or a component or components thereof) to perform certain operations specified by the instructions.

The mask value reset mechanism is to generate a new mask value associated with a given memory module. In some examples generating a new mask value is implemented by a module manager (e.g., the module manager 44) of the memory system. In some examples generating a new mask value is implemented by an entity of the memory system 1 that comprises a MKM. The new mask value may be generated in any of the ways described above in relation to the mask value associated with memory module 10 of FIG. 3 or the memory system 1 of FIG. 1. The mask value reset mechanism is also to divide the generated new mask value into at least two new mask shares. In some examples dividing the generated new mask value into at least two new mask shares is implemented by a module manager of the memory system. In some examples dividing the generated new mask value into at least two new mask shares is implemented by an entity of the memory system 1 comprising a MKM. The new mask value may be divided into shares in any of the ways described above in relation to the mask value associated with the memory module 10 of FIG. 3 or the memory system 1 of FIG. 1. The mask value reset mechanism is also to update root key information stored by the given memory module by replacing the mask share stored in the persistent memory of the given memory module with one of the new mask shares, and replacing a masked root key stored in the persistent memory of the given memory module with a new masked root key. In some examples updating the root key information stored by the given memory module is implemented by the given memory module.

In some examples the mask value reset mechanism is activated in response to a detection—e.g., by a memory module 10, a module manager 44, or an entity of the memory system comprising a MKM—that a memory module 10 has been attacked, has failed, or has been removed from the memory system 1. In some examples the detection is achieved by continually monitoring the status of the links between the modules in the memory system 1, e.g., by means of the memory modules 10 in the memory system 1 periodically sending status messages to neighbouring memory modules, and/or periodically checking for the receipt of status messages from neighbouring memory modules.

In some examples the mask value reset mechanism is to determine which memory modules 10 of the memory system 1 are impacted by an attack, failure, or removal of an entity from the memory system 1. An impacted memory module may comprise a memory module 10 associated with a mask value of which a share was stored by the attacked memory module. Determining whether a given module is impacted may comprise, therefore, determining the identity of a share or shares stored by the attacked module (where the "identity" of a share may comprise or be based on the mask value of which it is a share, and/or the identity of a module that is associated with the mask value of which it is a share). Determining the identity of a share or shares stored by an attacked memory module may comprise accessing a share storage location record.

In some examples the mask value reset mechanism is to request each impacted module to create a new masked root key using a new mask value associated with the impacted memory module (where the new mask value is different to the previous mask value associated with the impacted memory module, which had a share held by the attacked module). This operation may comprise sending a request message to the impacted module from, e.g., another memory module in the memory system 1 (e.g., a memory module comprising a MKM), a module manager 44, etc.

In some examples the mask value reset mechanism is to receive a new mask value associated with a given impacted memory module from the given impacted module. A new mask value may be received from each impacted module, in which case the following operations of the mask value reset mechanism are performed separately in respect of each received new mask value. A new mask value associated with a given impacted memory module may be received, e.g., in a message from the given impacted memory module.

In some examples the mask value reset mechanism is to divide the received new mask value into shares. The share dividing may be performed in any of the manners described above in relation to the initial share splitting and distribution operations performed by the MKM during initialisation of the memory system.

In some examples the mask value reset mechanism is to distribute the shares of the new mask value to a plurality of memory modules 10 in the memory system 1. The plurality of memory modules may comprise a subset of memory modules associated with the memory module from which the new mask value was received (i.e., the given impacted memory module). Such a subset may comprise t or more members, where t is a threshold of a secret sharing scheme. The subset of memory modules may be randomly selected. The subset of memory modules may exclude those attacked.

The subset of memory modules may exclude those removed by an attacker. The share distribution may be performed in any of the manners described above in relation to the initial share splitting and distribution operations performed by the MKM during initialisation of the memory system.

In some examples the mask value reset mechanism is to update the record of storage locations to include storage locations of the shares of the new mask value. Updating the share storage location record may comprise deleting locations of shares of the impacted mask value (i.e., the previous mask value associated with the given impacted memory module). Updating the share storage location record may be performed in any of the manners described above in relation to the creation and/or population of the share storage location record performed by the MKM during initialisation of the memory system.

In some examples the operations described are implemented by a module manager of a memory system, e.g., the module manager 44 of the memory system 4. In some examples the operations described herein are implemented by an entity of a memory system that comprises a MKM. In some examples the operations described herein can be implemented by a memory module of a memory system (e.g., the memory system 1) other than the given impacted module.

In some examples the mask value reset mechanism is to create a new masked root key associated with each impacted memory module. In some examples creating a new masked root key is performed responsive to receiving a request, (e.g., from another entity of the memory system, from a memory module comprising a MKM, from a module manager, etc.) module to create a new masked root key. Creating a new masked root key may be performed by the control unit of an impacted memory module. The new masked root key may be created by combining the root key associated with a given impacted memory module with a new mask value. The new mask value may be different from a previous mask value associated with the given impacted memory module. The new mask value may be different from any previous mask value associated with the given impacted memory module. Creating a new masked root key may comprise storing the new masked root key, e.g., in the persistent memory of the given impacted memory module. Creating a new masked root key may comprise deleting a previous masked root key associated with the given impacted memory module, e.g., from the persistent memory of the given impacted memory module. The new masked root key may therefore replace a previous masked root key. The root key from which the new masked root key is derived may be the same as the root key from which the previous masked root key was derived. This means that data access from impacted memory modules need not be affected by the attack or removal of a memory module of the memory system.

In some examples the mask value reset mechanism is to send the new mask value, e.g., by the control unit 23 of the given impacted memory module, to another entity of the memory system. The other entity may be, e.g., another memory module, a memory module comprising a MKM, a module manager, etc. Sending the new mask value may comprise sending a message including the new mask value.

In some examples the operations described herein are implemented by a memory module of a memory system, e.g., the memory module 10 of the memory system 1. In some examples the operations described herein are implemented by a impacted memory module. In some examples the operations described are implemented by each impacted memory module. In some examples each memory module 10 in the memory system 1 comprises a set of mask value reset instructions that, when executed by a processor of the memory module, implement the operations described herein paragraphs. This ensures that security of and access to stored data in remaining modules can be maintained after the attack of (or several, but less than t) memory modules, regardless of which memory modules are attacked.

Figure 6:
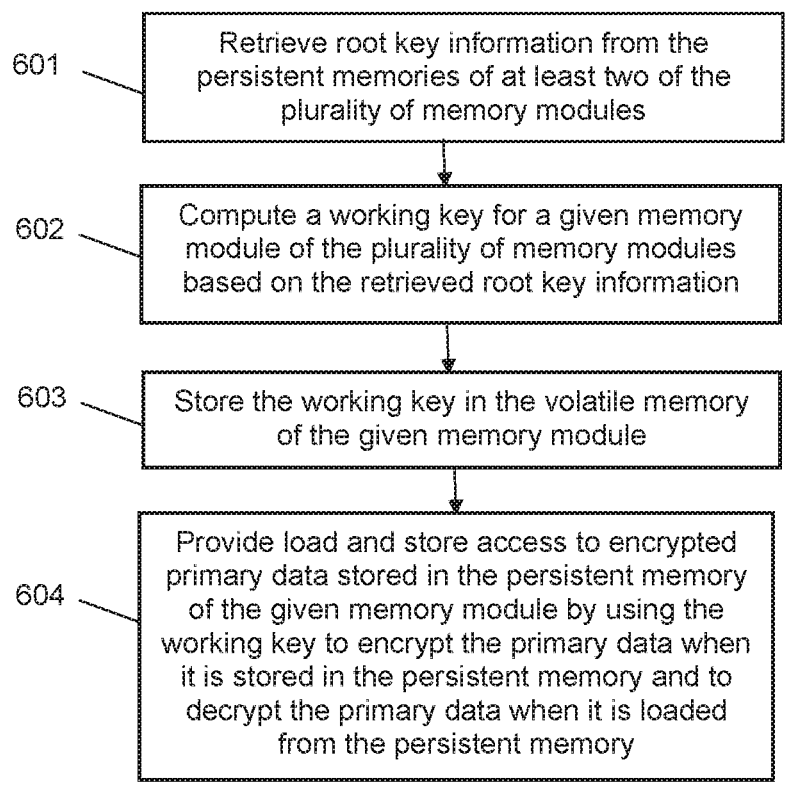
FIG. 6 is a flowchart of an example method for implementation by an example memory system.

FIG. 6 is a flowchart of an example method, e.g., for securing an example memory system (e.g., the memory system 1 of FIG. 1 or the memory system 4 of FIG. 2) comprising a plurality of memory modules, each memory module comprising a persistent memory and a volatile memory. The method may be, e.g., for maintaining security of data stored by the memory system. Although execution of the methods described below are with reference to the memory systems and module of FIGS. 1-3, other suitable devices for execution of this method may be employed to practice the present techniques. The flow diagram described in FIG. 6 and other figures may be implemented in the form of executable instructions stored on a machine-readable storage medium, such as a memory unit of a module of the memory system, by a component or multiple components described herein, and/or in the form of electronic circuitry.

The various processing blocks and/or data flows depicted in FIG. 6 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the operations depicted in the flow diagram as illustrated (and described in greater detail below) are meant be an example and, as such, should not be viewed as limiting.

In block 601, root key information is retrieved from the persistent memories of at least two memory modules of the plurality of memory modules. The at least two memory modules may comprise at least t memory modules, where t is a threshold of a threshold cryptography scheme or a threshold-based secret sharing scheme. Retrieving the root key information may comprise requesting the root key information from the at least two memory modules. Retrieving the root key information may comprise receiving the root key information from the at least two memory modules. The retrieved root key information may have any of the features described above in relation to the operation of the memory system 1 of FIG. 1 and/or the memory module 10 of FIG. 3.

In block 602, a working key for a given memory module of the plurality of memory modules is computed, based on the retrieved root key information. The working key may have any of the features described above in relation to the operation of the memory system 1 of FIG. 1 and or the memory module 10 of FIG. 3. The working key may be computed in any of the ways described above in relation to the operation of the memory system 1 of FIG. 1 and/or the memory module 10 of FIG. 3. In some examples, the working key for the given memory module is computed using a threshold cryptography scheme (also known as a threshold cryptosystem scheme). Under a threshold cryptosystem scheme it may be necessary, in order to decrypt an encrypted message, for more than a threshold number of parties (e.g. memory modules) to cooperatively participate in a decryption protocol. In some examples, the working key may be encrypted using such a scheme, such that the parties are a subset of the other memory modules (i.e. other than the given memory module). Computing the working key thus may involve the subset of memory modules cooperating to decrypt the working key.

In block 603, the working key (i.e., the working key computed in block 602), is stored in the volatile memory of the given memory module. The volatile memory may have any of the features described above in relation to the memory module 10 of FIG. 3.

In block 604, load and store access to primary data, which is stored encrypted in the persistent memory of the given memory module, is provided. The load and store access may be provided by using the working key (i.e., the working key stored in the volatile memory of the given memory module) to encrypt the primary data before it is stored in the persistent memory and to decrypt the primary data after it is loaded from the persistent memory. The load and store access may be provided in any of the ways described above in relation to the operation of the memory system 1 of FIG. 1.

Figure 7:
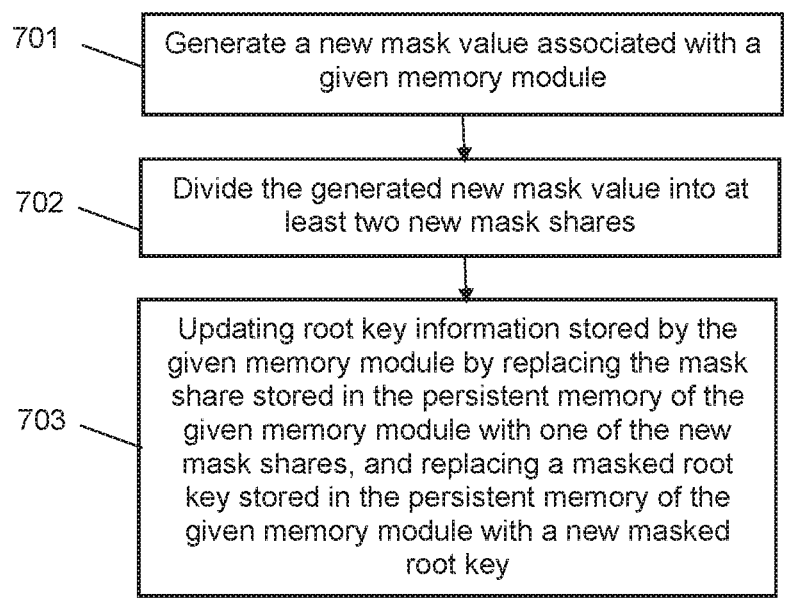
FIG. 7 is a flowchart of an example method for implementation by an example memory system.

FIG. 7 is a flowchart of an example method, e.g., for securing an example memory system (e.g., the memory system 1 of FIG. 1 or the memory system 4 of FIG. 2) comprising a plurality of memory modules, each memory module comprising a persistent memory and a volatile memory. The method may be, e.g., for maintaining security of data stored by the memory system.

In block 701 a new mask value associated with a given memory module is generated. The new mask value may be randomly generated. The new mask value may have any of the features described above in relation to the operation of the memory system 1 of FIG. 1 and/or the memory module 10 of FIG. 3. The new mask value may be generated in any of the ways described above in relation to the operation of the memory system 1 of FIG. 1 and/or the memory module 10 of FIG. 3.

In block 702 the new mask value is divided into at least two new mask shares. The at least two new mask shares may have any of the features described above in relation to the operation of the memory system 1 of FIG. 1 and/or the memory module 10 of FIG. 3. The new mask value may be divided into at least two new mask shares in any of the ways described above in relation to the operation of the memory system 1 of FIG. 1 and/or the memory module 10 of FIG. 3.

In block 703 root key information stored by the given memory module is updated. In some examples updating the root key information stored by the given memory module comprises replacing the mask share stored in the persistent memory of the given memory module with one of the new mask shares. In some examples updating the root key information stored by the given memory module comprises replacing a masked root key stored in the persistent memory of the given memory module with a new masked root key. Updating the root key information may be done in any of the ways described above in relation to the operation of the memory system 1 of FIG. 1 and/or the memory module 10 of FIG. 3.

In some examples the method of FIG. 7 is implemented by a mask value reset mechanism of the memory system, which may have any of the features described above in relation to the mask value reset mechanism of the memory system 1.

Examples in the present disclosure can be provided as methods, systems or machine readable instructions. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules or engines of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

We claim:

1. A memory system comprising:
   a plurality of memory modules, wherein a first memory module of the plurality of memory modules comprises:
   a solid-state non-volatile memory to store root key information and encrypted primary data, the encrypted primary data being based on encryption of primary data using a working key, the root key information comprising a masked root key produced by combining a root key and a mask value, wherein the mask value comprises at least two mask shares distributed among the plurality of memory modules,
a volatile memory to store the working key for decrypting the encrypted primary data and encrypting the primary data,
a control circuit to load the primary data and store the encrypted primary data; and
a working key recovery mechanism comprising a hardware processor to:
retrieve a first mask share of the mask value from a second memory module of the plurality of memory modules, and a second mask share of the mask value from a third memory module of the plurality of memory modules,
compute the mask value using the first mask share of the mask value and the second mask share of the mask value,
compute the root key using the masked root key and the computed mask value, and
compute the working key from the computed root key.

2. The memory system of claim 1, wherein the working key recovery mechanism is implemented by at least one of the plurality of memory modules.

3. The memory system of claim 1, further comprising a module manager in communication with each of the plurality of memory modules, wherein the working key recovery mechanism comprises a set of instructions for execution by a processor of the module manager.

4. The memory system of claim 1, wherein the root key associated with the first memory module is also associated with at least one other memory module of the plurality of memory modules, or the mask value associated with the first memory module is also associated with at least one other memory module of the plurality of memory modules.

5. The memory system of claim 1, wherein the root key is a first root key, wherein the first memory module is associated with the first root key, and the second memory module is associated with a second, different root key, and wherein the masked root key stored in the solid-state non-volatile memory of the first memory module is a first masked root key derived from the first root key, and a solid-state non-volatile memory of the second memory module is to store a second masked root key derived from the second root key.

6. The memory system of claim 1, wherein the hardware processor of the working key recovery mechanism is to compute the working key for the first memory module using one of a secret sharing scheme, or a threshold cryptography scheme.

7. The memory system of claim 1, wherein the control circuit is to load the primary data via a memory bus to at least one processor.

8. The memory system of claim 1, wherein the first mask share of the mask value is from a solid-state non-volatile memory of the second memory module, and the second mask share of the mask value is from a solid-state non-volatile memory of the third memory module.

9. The memory system of claim 8, wherein the hardware processor of the working key recovery mechanism is to further:
retrieve a third share of the mask value from the solid-state non-volatile memory of the first memory module, and
compute the mask value based further on the third share of the mask value.

10. The memory system of claim 1, wherein the hardware processor of the working key recovery mechanism is to further send the computed mask value to the first memory module, and
wherein the control circuit of the first memory module is to decrypt the encrypted primary data using the computed mask value received from the working key recovery mechanism.

11. The memory system of claim 1, wherein the masked root key is based on one of:
an exclusive or (XOR) of the root key and the mask value,
an addition of the root key and the mask value,
a multiplication of the root key and the mask value,
a cryptographic operation of the root key and the mask value, or
a hashing process of the root key and the mask value.

12. A method for securing a memory system comprising a plurality of memory modules, each memory module of the plurality of memory modules comprising a solid-state non-volatile memory and a volatile memory, the method comprising:
retrieving different mask shares of a mask value from respective solid-state non-volatile memories of at least two memory modules of the plurality of memory modules, wherein the mask value comprises at least two mask shares distributed among the plurality of memory modules;
computing the mask value for a given memory module of the plurality of memory modules using the retrieved different mask shares of the mask value, wherein the given memory module is different from the at least two memory modules;
computing a root key for the given memory module based on the computed mask value and a masked root key, wherein the masked root key is produced by combining the root key and the mask value;
computing a working key for the given memory module based on the computed root key;
storing the computed working key for the given memory module in the volatile memory of the given memory module, the computed working key for encrypting primary data, and decrypting the encrypted primary data;
loading the primary data; and
storing the encrypted primary data, in the solid-state non-volatile memory of the given memory module.

13. The method of claim 12, comprising:
generating a new mask value associated with the given memory module;
dividing the generated new mask value into at least two new mask shares; and
updating root key information stored by the given memory module by replacing a mask share stored in the solid-state non-volatile memory of the given memory module with one of the new mask shares, and replacing the masked root key stored in the solid-state non-volatile memory of the given memory module with a new masked root key, the new masked root key being derived from the one of the new mask shares and the root key associated with the given memory module.

14. The method of claim 12, wherein the root key associated with the given memory module is a highest-level key of a key hierarchy associated with the given memory module, the key hierarchy for use in accessing data stored in the solid-state non-volatile memory of the given memory module.

15. The method of claim 12, wherein the mask value is computed further based on another mask share of the mask value retrieved from the solid-state non-volatile memory of the given memory module.

\* \* \* \* \*